United States Patent [19]
Geasland

[11] Patent Number: 5,131,553
[45] Date of Patent: Jul. 21, 1992

[54] TUBULAR PLASTIC SHIPPING, STORAGE AND DISPENSING CONTAINER AND PARTS USABLE THEREWITH

[76] Inventor: Gordon Geasland, P.O. Box 159, Staten Island, N.Y. 10301

[21] Appl. No.: 555,441

[22] Filed: Aug. 14, 1990

[51] Int. Cl.$^5$ .............................................. B65D 53/00
[52] U.S. Cl. .................... 220/235; 220/234; 215/360; 222/542; 222/568; 222/569; 229/125.15; 229/125.17; 383/60; 383/96; 383/906
[58] Field of Search ............... 220/233, 234, 235, 238, 220/236; 215/358, 360; 138/89, 90; 383/60, 96, 904, 906; 229/125.06, 125.15, 125.17; 222/542, 567, 568, 569

[56] References Cited

U.S. PATENT DOCUMENTS

| | | | |
|---|---|---|---|
| 408,364 | 8/1889 | Traut | 215/359 |
| 530,840 | 12/1894 | Harrison | 220/235 |
| 543,745 | 7/1895 | Meyer | 220/235 |
| 966,748 | 8/1910 | Honecker | 285/338 |
| 1,068,793 | 7/1913 | Mason | 220/236 |
| 1,843,002 | 1/1932 | Small | 220/233 |
| 2,070,579 | 2/1937 | Brooke | 220/235 |
| 2,170,866 | 8/1939 | McAllister | 220/233 |
| 2,321,515 | 6/1943 | Rice | 215/359 |
| 2,493,521 | 1/1950 | Grigg | 285/189 |
| 2,750,601 | 6/1956 | Houle | 220/233 X |
| 2,886,067 | 5/1959 | Maxwell et al. | 138/90 |
| 2,924,246 | 2/1960 | Markel | 138/89 |
| 2,977,992 | 4/1961 | Jensen | 220/233 X |
| 3,019,950 | 2/1962 | Callegari | 222/542 |
| 3,044,496 | 7/1962 | Maisch | 138/89 |
| 3,326,403 | 6/1967 | Glass | 220/234 |
| 3,667,640 | 6/1972 | Morrow | 220/235 |
| 4,205,767 | 6/1980 | Shackelford | 222/542 |
| 4,380,302 | 4/1983 | Broad | 220/235 |
| 4,625,765 | 12/1986 | O'Donnell et al. | 138/89 |

FOREIGN PATENT DOCUMENTS

169461 5/1934 Switzerland ................ 220/235

*Primary Examiner*—Stephen Marcus
*Assistant Examiner*—Stephen Cronin
*Attorney, Agent, or Firm*—Caeser, Rivise, Bernstein, Cohen & Pokotilow, Ltd.

[57] ABSTRACT

A container (20) made of a rigid tubular conformation, each end (21, 22) of which is flattened to produce and provide outwardly protruding edges (25). A transition portion (33) between the flattened end portion (22) and undeformed body portion has a sloped wall in which at least one access aperture (24) is formed. The aperture (24) is selectively closed by a plug, valve or cap adapted to be secured in a fluid-tight manner in this container (20). Hand hold apertures (e.g., 23) may be formed where the ends are sealed. Disposable or reusable bladders, bags and/or liners (58, 70) can be used with these containers, and can be extended out of the fitting (50, 72) and can be gathered together and sealed (59) to provide a sanitary and tamper-proof covering. The container (20) may be pressurized if desired. An expanding plug assembly (100) having a body (102) formed of a pair of resilient members (104, 106) separated by a thin plate or diaphragm (108) also forms a part of this invention.

8 Claims, 12 Drawing Sheets

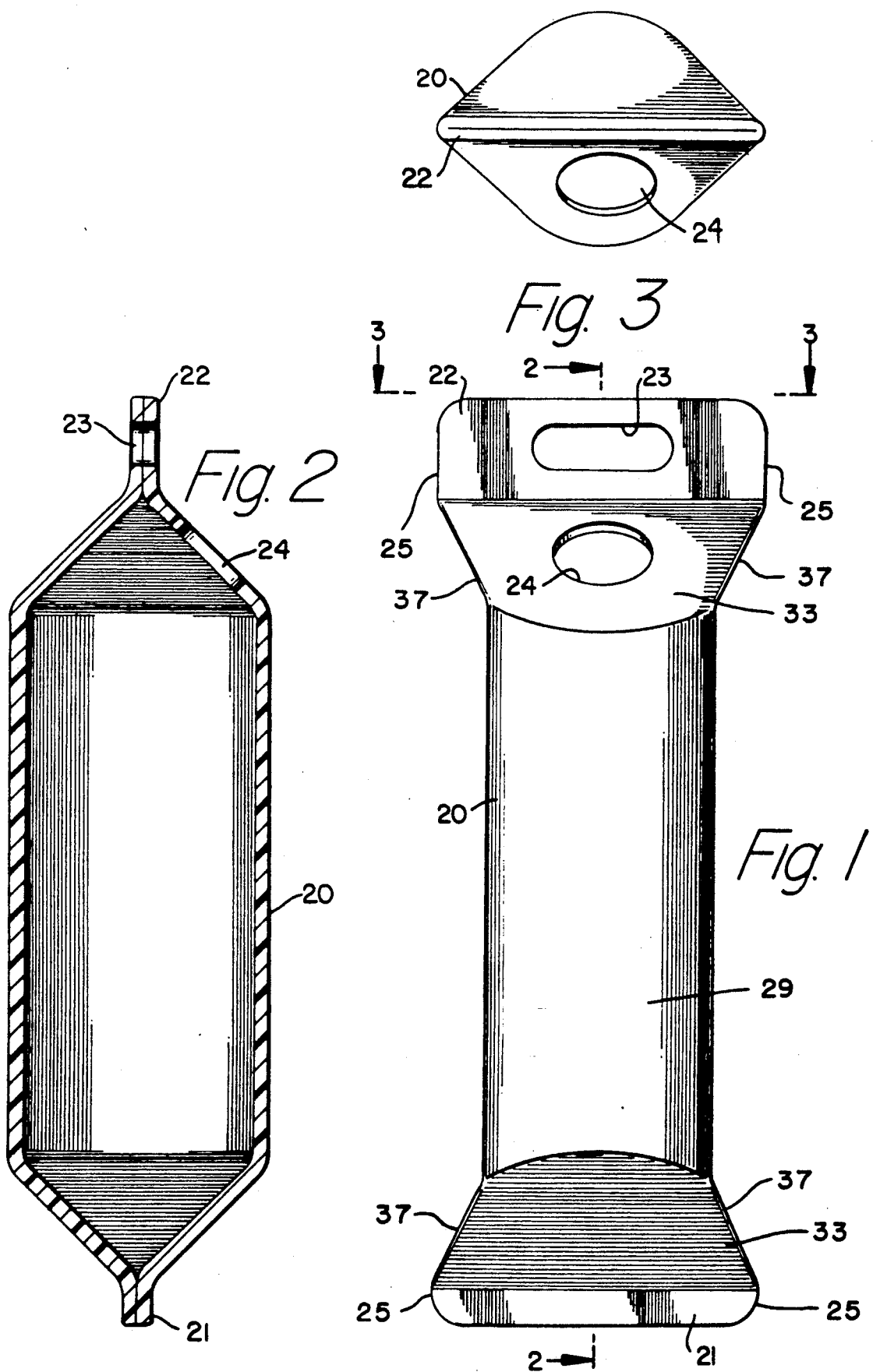

TUBULAR PLASTIC SHIPPING, STORAGE AND DISPENSING CONTAINER AND PARTS USABLE THEREWITH

BACKGROUND ART

Storage containers are found in many sizes, shapes and construction. In U.S. Pat. No. 1,682,179 to Krembs, as issued Aug. 28, 1928, a container for retaining a grouping of welding rods is an erected carton with side panels made from a relatively strong bland. This container is not contemplated to be fluid-tight. U.S. Pat. No. 2,464,278 to Wilson, as issued Mar. 15, 1949, shows a tubular member, but the end caps do not suggest a fluid-tight enclosure. U.S. pat. No. 2,491,213, as issued to Robinson, Jr. on Dec. 13, 1949, shows a tubular enclosure with sheet metal caps or bungs. The tubular portion is of cardboard or fiber and the like. These containers are contemplated for shipping and do not suggest a fluid-tight enclosure. U.S. pat. No. 2,975,888 to Paynton, Sr., as issued mar. 21, 1961, discloses an archery package for storage and shipping arrows. A fluid-tight enclosure is not taught.

Also noted is U.S. Pat. No. 3,084,788 to Ford, as issued Apr. 9, 1963, which pertains to a knitting needle holder of thin plastic tubing, and there is no suggestion of strength and fluid-tightness associated with this construction. A rod toter is shown in U.S. Pat. No. 3,235,148, as issued to Honhart on FIG. 15, 1966. This toter is open to the top although for welding rods which may total several pounds. U.S. pat. No. 3,847,274 to Inglish, issued Nov. 12, 1974, pertains to a capillary tube dispenser and uses an open top cup to hold these tubes. U.S. Pat. No. 4,029,202 to Lasich, as issued June 14, 1977, shows a one-piece plastic cap used with a tube member. There is no teaching of making the container fluid-tight. U.S. Pat. No. 4,051,992, as issued to Bergstein on Oct. 4, 1977, shows a tubular container, but there is no teaching of a fluid-tight container.

Also noted are U.S. Pat. Nos. 2,319,448 (Frostad); 1,053,492 (Hadfield) and 3,156,350 (Lockwood). The patents to Hadfield and Lockwood disclose the forming of containers from a tubular plastic blank by sealing the ends of the blank. The patent to Frostad discloses a soda straw package having compressed, sealed ends.

Also noted is the Dual Pak system in which a sturdy plastic bottle is protected by a high-strength corrugated box. In this system, as is disclosed in a six-page informational piece relating thereto, the bottle does not appear to be attached to the box through any compression seal member.

Also noted are U.S. pat. Nos. 4,601,410, issued to Bond, and 4,286,636, issued to Credle. These latter patents disclose collapsible bag structures employing a spout as part of the construction.

Other patents which disclose flexible, material-containing packages, either alone or in combination with more rigid supporting structures are U.S. Pat. Nos. 4,466,553 (Zenger); 3,851,688 (deWinter); 3,589,506 (Ford); 3,225,967 (Heimgartner); 3,171,571 (Daniels); 3,057,517 (Douglas); 2,966,282 (Geiser); 2,816,690 (Lari); 2,671,578 (McBean); 2,751,127 (Mitton) and 2,564,163 (Leperre). None of these latter mentioned patents disclose a system wherein a flexible liner, bag or bladder is sealed by an expanding plug against the edge of an aperture in a more rigid container.

Also noted were U.S. pat. Nos. 3,229,813, issued to Crowe, Jr. et al.; 2,821,338, issued to Metzger and 3,019,950, issued to Callegari. The Crowe, Jr. et al. patent relates to a flexible, sterile package for items such as cotton balls; not to any rigid package of the type forming the subject matter of the present invention. The Metzger patent relates to a package formed of a flexible film-type material, including a tube-like check valve as part of the package construction. The Callegari patent discloses a sealing member for a punctured can which is adapted to be secured to the can, and thereby provide a pouring spout for the contents in the can.

A variety of expanding plugs are known in the prior art for expanding into engagement with peripheral surfaces defining an opening in a receptacle. These expanding plugs generally have an elastomeric central section which is axially compressed, to thereby radially expand the member into engagement with the surface defining the opening. The prior art systems are generally employed by fully seating the plug within the opening, and are not concerned with aligning the expanding plug body midway in the opening, as is generally preferred when sealing an opening in a thin-walled receptacle.

Exemplary prior art plugs are disclosed in U.S. Pat. Nos. 408,364 (Traut)); 966,748 (Honecker); 1,843,002 (Small); 2,070,579 (Brooke); 2,170,866 (McAllister); 2,321,515 (Rice); 2,493,452 (Grigg); 2,886,067 (Maxwell, et al.); 2,924,246 (Markel); 3,044,496 (Maisch) and 3,326,403 (Glass).

DISCLOSURE OF THE INVENTION

This invention relates to a container made from thermo-plastic tubing with the ends flattened, and fused, cemented or welded together after the ends have been softened by and with heat. An opening is formed in and at one or both ends, in a sloping wall section of the container, and provides access to the interior of the container. This opening is selectively closed with a closure member, plug or cap, preferably providing a fluid-tight enclosure.

In accordance with the preferred form of this invention the container is formed of a rigid material having a thickness of at least 1/16", and the flattened end portions, disposed on opposite sides of a substantially undeformed rigid body portion of the container, has a transverse dimension between transversely spaced-apart lateral edges, with the lateral edges extending transversely beyond the outer peripheral surface of the substantially undeformed body portion.

A transition portion joins each of the flattened end portions to the undeformed body portion of the container, and each of the transition portions includes two substantially flat sloping wall sections which diverge from each other in a direction from the flattened end portion to the rigid body portion. At least one of the transition portions includes flared, transversely spaced-apart lateral surfaces extending from the transversely spaced-aprt lateral edges of the flattened end portion to the body portion and being engagable for desired suspension and the like. Preferably the access opening or aperture into the container is provided in and through a substantially flat and sloping wall section of the transition portion of the container, and closure means are provided for closing this access aperture.

In accordance with this invention containers can be employed either with or without flexible bladders or liners therein to adapt the container for storing a wide variety of different materials, and also to adapt the container to be used as a dispenser. The container preferably is selected from a material that is fire-retardant, shatterproof, corrosion-resistant, waterproof, and resistant to chemicals. It can be made airtight and watertight and the wall thickness is selected so as to withstand high pressures from the outside as well as the inside. An address label can be placed on the container and it can be shipped without repackaging.

This container requires no elaborate or expensive equipment to manufacture, and it can be modified easily to hold a variety of contents. The thermoplastic, extruded, light-wall tubular materials which can be used for the container are readily available and relatively inexpensive compared to other container materials. Short-run manufacture is practical for small requirements.

Round, extruded thermoplastic tubing is used because it is common and readily available, but dies could also be made up to extrude a square or rectangular cross-sectional tubing. A "squarish" shape would be treated in the same manner as the round.

The container can be reused, if desired, and sent back to the factory for refills (in the same manner as a deposit bottle) or used for another purpose.

Since the containers are non-sparking, they are well suited for the transport, storage and dispensing of many types of hazardous materials, such as volatile liquids and explosives.

In accordance with this invention a unique expanding plug for sealing an opening includes a tandem expanding body section formed by a pair of resilient members which are capable of radially expanding as they are axially compressed. A separating member, in the form of a disk or diaphragm, is positioned between the resilient members; preferably in contact with contiguous surfaces of each of the resilient members. Compression members are axially spaced-apart on opposite sides of the pair of resilient members, and an actuating means is provided for axially moving the compression members toward each other to thereby axially compress the resilient members to cause the members to radially expand into engagement with surfaces defining an opening in a container.

In accordance with this invention the dividing disk or diaphragm tends to cause each of the resilient members to expand independently of each other. Although the region of the resilient members in the central section of the tandem body, in the region of the disk or diaphragm, also will expand, the frictional engagement between the diaphragm and resilient members tends to retard radial expansion of this central section, relative to the redial expansion that takes place at the midpoint to each of the resilient members. This causes upper and lower bulges to be formed in the tandem body, which function to center the plug in the container opening. Moreover, the bulges tend to be symmetrical on each side of the opening, thereby assisting in retaining the plug within the opening. In other words, there is no unbalance of elastic forces with the use of the plug of this invention, which might tend to dislodge the plug from its sealing engagement with the peripheral walls of a container opening.

In accordance with the method of this invention the container is manufactured quickly and easily using a minimum amount of equipment and unskilled labor. Initially, the extruded plastic shell is cut off at the proper length for the desired use. The ends are uniformly heated by one of various proven methods (in an oven, by rotating the length with the ends under an infrared heat source, or even by an ultrasonic heater); cement and/or solvent is applied; and the ends are pressed together and clamped. An opening for venting, filling, pressurizing and dispensing, as well as a built-in handle as depicted, is, if desired, made with almost any common cutting tool.

BRIEF DESCRIPTION OF THE DRAWINGS

FIG. 1 is a plan view, partly diagrammatic, and depicting the container of this invention, with one end provided with an access hole and a handle portion;

FIG. 2 is a sectional view of the container of FIG. 1, this view taken on the line 2—2 thereof and looking in the direction of the arrows;

FIG. 3 is an end view, partly diagrammatic, and showning the container as seen on the line 3—3 of FIG. 1 and looking in the direction of the arrows;

DESCRIPTION OF THE PREFERRED EMBODIMENT OF THE INVENTION

Figure 4:
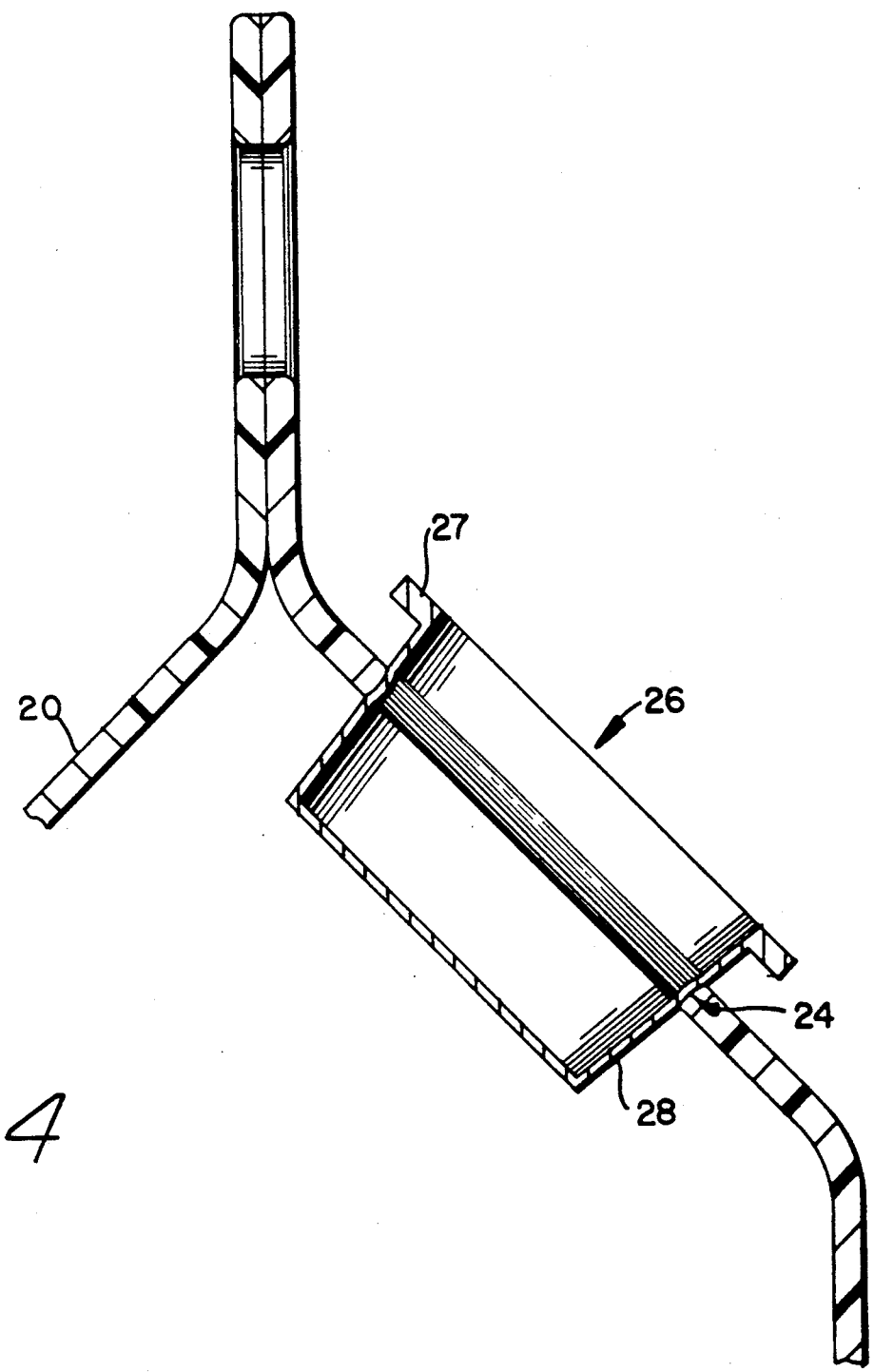
FIG. 4 is a partly fragmentary and sectional side view of an unthreaded closure plug for the aperture formed in the end of the container.

Referring to FIGS. 1-3 of the drawings, a tubular container of this invention is generally identified as 20. This container is contemplated as to be made from a tubular length of thermoplastic material which is commercially available in long lengths, such as ten to forty feet. The diameter of this tubing is usually from three to twenty-seven inches. The wall thickness for said container is at least one-sixteenth (1/16) of an inch and may be more than one-quarter of an inch in thickness. The wall thickness is determined by the intended use for the container. The length of the container is a matter of selection. To provide the depicted container, the longer length of pipe is cut to a selected length. After cutting, the ends are heated by known means so that the end portions may be formed into a desired shape or configuration. With and by simple clamp or die means, the end portions 21 and 22 are flattened to be brought to each other to provide a bond, fuse or a welding of these ends. Cement, adhesive or solvents may also be used to insure that the bonded or fused ends are fluid-tight and are in a parallel, substantially side-by-side manner.

As can be seen bet in FIG. 1, the flattened end portions 21 and 22 have a transverse dimension defined between transversely spaced-apart laterally edges 25. These lateral edges are spaced transversely beyond outer peripheral surface 29 of the substantially undeformed body portion of the container 20.

As depicted, end portion 21 is made only sufficient for closing to bring this end portion into a flattened and sealed condition. It is to be noted that the corners can be rounded to remove unwanted sharp ends or corners. This contouring of the corners is easily provided by dies, abrasive tools or saws. The other end portion is also heated and, as seen in FIG. 2, is also flattened to bring this end into a side-by-side relationship. This end portion 22 is depicted as being longer than end 21 and in this end is formed a hand grip aperture 23. Other holes or configurations may be made, particularly those for indexing and/or suspension. Both ends can be made longer to provide these apertures. Both ends are usually processed substantially simultaneously. Hand holes such as depicted are for manipulation and as a convenience for carrying the container. It is contemplated that this end is sealed, fused, welded or bonded as the other end to provide a fluid-tight closure.

As can be seen best in FIG. 1, one of the sloped end transition portions 33 of the container is formed with an aperture 24 which is selectively closed by closure devices depicted in later discussed Figs. The transition portions 33 join each of the end portions 21 and 22 to the substantially undeformed body portion. These transition portions include flared, transversely spaced-apart, laterally extending surfaces 37, which extend from the lateral edges 25 of the flattened end portions 21 and 22 to the outer peripheral surface 29 of the substantially undeformed body portion.

Referring to FIG. 4, the container 20 described above has an aperture 24 providing access to the interior of said container. This aperture may be closed selectively by and with a molded plug, generally identified as 26. This plug is shown with an integral flange 27 which is designed to prevent the molded plug from being forced through the aperture 24. This plug has a cup-shaped portion 28 which conventionally has a taper provided therein. This molded plug member is made slightly resilient to conform to the formed aperture 24 while allowing insertion and removal of the cap to be achieved.

Figure 5:
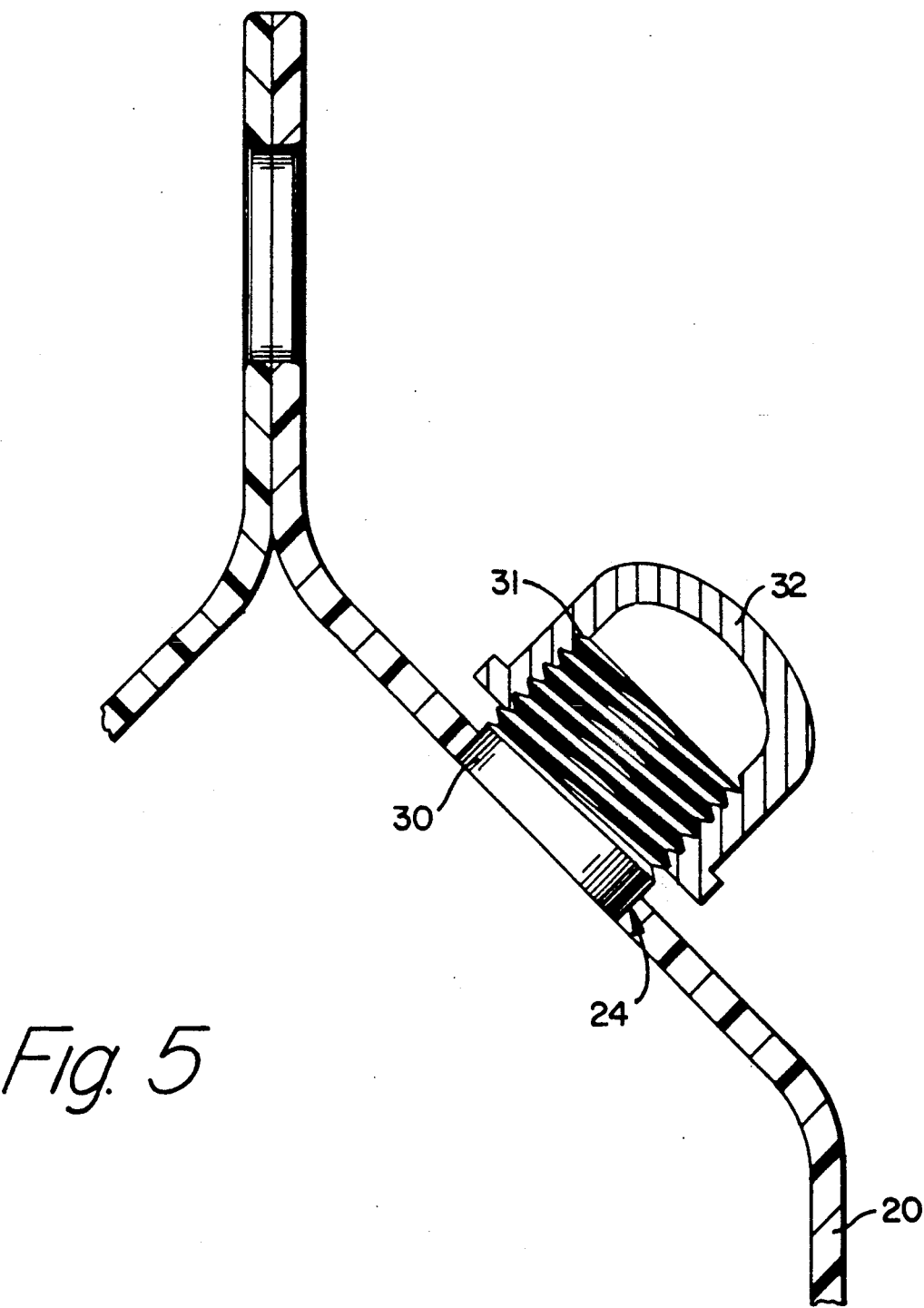
FIG. 5 is a partly fragmentary and sectional view of another closure means for the aperture formed in the end of the container.

With reference to FIG. 5, the container 20 shown above and the aperture 24 formed in a side wall portion receive and retain a threaded nipple member 30 which is secured as by welding, cementing or bonding to the container wall. This nipple member 30 may be of plastic or metal and the attached nipple shank portion is desirably made fluid-tight by means such as adhesive, cement or welding. It is contemplated that mounting of this nipple is permanent so that the nipple may not be rotated accidentally. A tapered, threaded portion 31 of this nipple is depicted, and to seal or close this outer threaded portion a tapered threaded plastic or metal cap member 32 is shown removably mounted on this nipple member 30. The threaded end of this nipple may be used for the attaching or removably attaching of other types or styles of tapered, threaded fittings.

Figure 6:
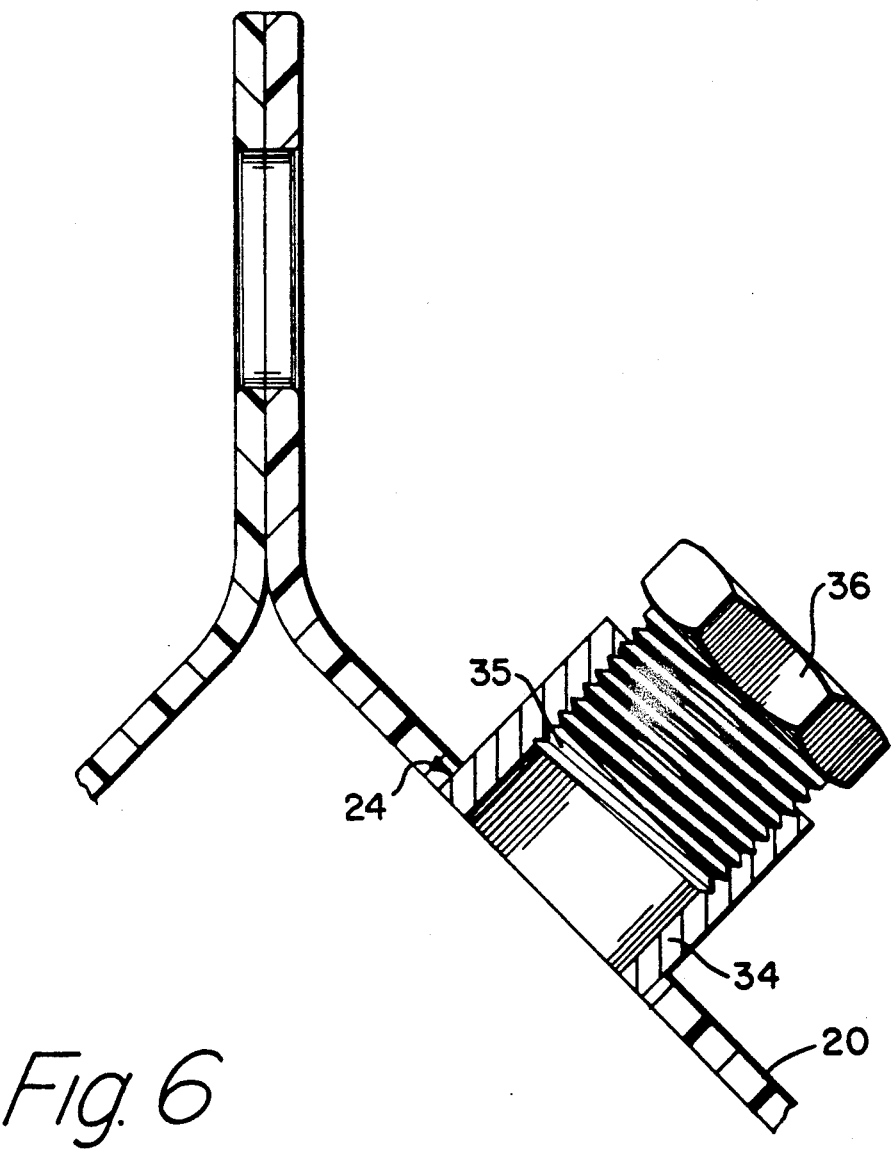
FIG. 6 is partly fragmentary and sectional side view of yet another closure concept or means for a closure for the aperture formed in the end of the container.

Referring to the embodiment of FIG. 6, a half coupling 34 is secured in aperture 24 by cement, welding or the like. Rather than exterior threads and a female cap as in FIG. 5, an alternate closure of said container opening 24 is shown. The half coupling 34 has internal tapered threads 35, which opening in this half coupling is selectively closed by a tapered threaded plug 36 which is a conventional pipe plug. This pipe plug may be of metal or plastic and no patentable distinction is made therefor. The threaded half coupling may also be used for attaching valves or like types of threaded fittings.

Figure 7:
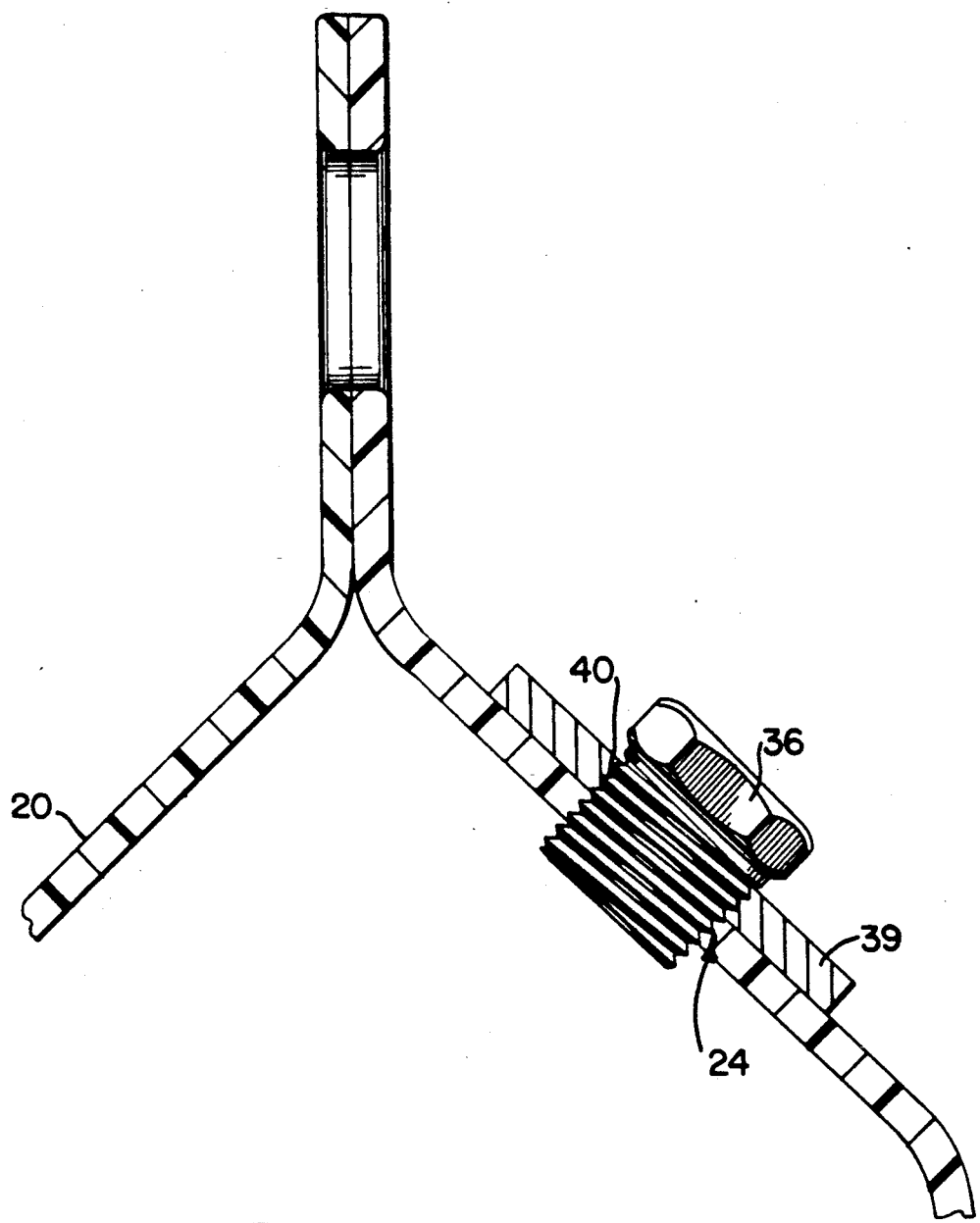
FIG. 7 is a partly fragmentary and sectional side view of yet another closure concept or means for a closure for the aperture formed in the end of the container.

In the embodiment shown in FIG. 7 the wall of the container 20 is normally rather thin, and the aperture 24 is reinforced and made substantially thicker by the addition of a cemented, bonded or welded doubler patch 39. This doubling of the wall thickness at the aperture 24 enables the doubler patch and wall of the container 20 to have through-formed threads 40 mady by a tap. In this threaded portion a removably retained pipe plug 36 may be inserted as shown and described earlier in connection with FIG. 6. It is to be noted that the drilled hole and tapping of this hole are performed after attachment of the doubler patch 39.

Figure 8:
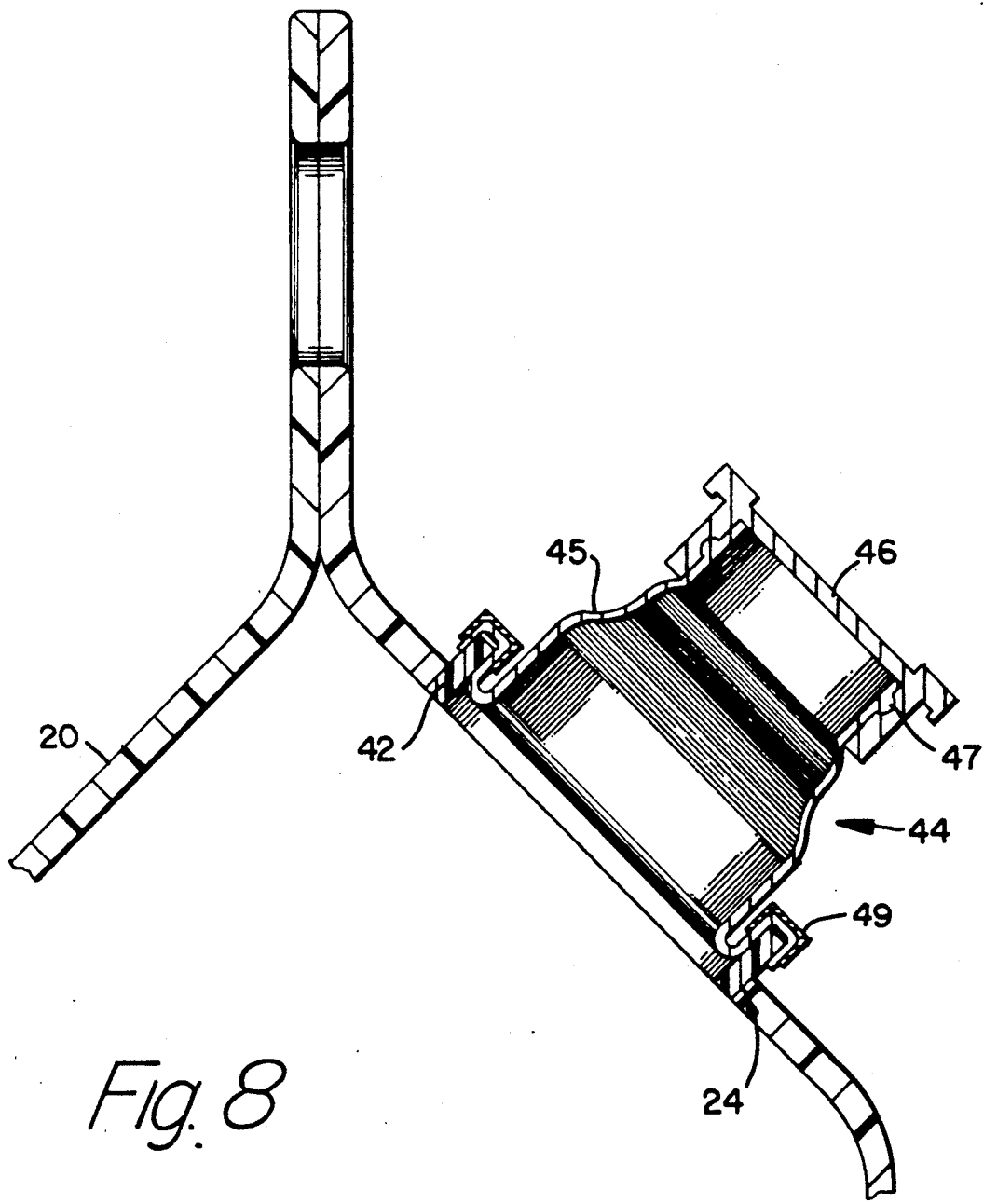
FIG. 8 is a partly fragmentary and sectional side view of yet another closure concept or means for a closure for the aperture formed in the end of the container.

In the embodiment shown in FIG. 8 the aperture 24 is shown as closed selectively with a commercially-available closure member. A tubular collar or neck member 42 is cemented, bonded or welded in place in the aperture to provide a protruding collar portion for attaching one end of this closure member, generally identified as 44. A flexible tubular portion 45 is attached at one end to the collar portion of member 42. The other end of flexible portion 45 is closed with a threaded molded cap 46 which is shown with a fast-thread portion 47. This flexible spout member 45 provides advantages for certain products and components. As depicted, a U-shaped ring 49 engages both the collar member 42 and a mating portion of the spout tubular portion 45. The ring 49 is caused to be closed with squeeze tools or the like so the spout 45, collar 42 and ring 49 provide a fluid-tight seal at this joining.

Figure 9B:
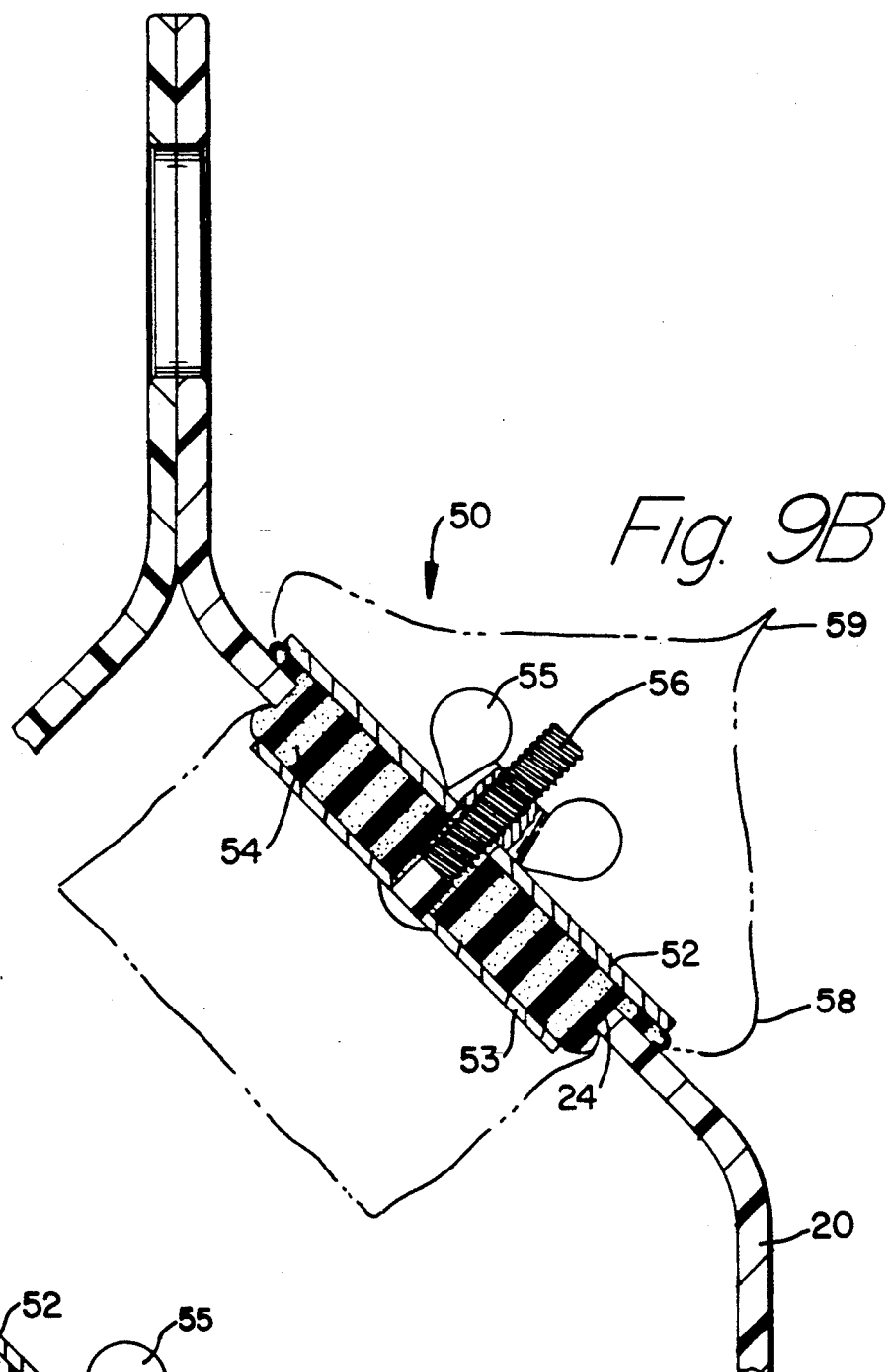
FIGS. 9A and 9B are a side sectional view and a fragmentary view, respectively, of a closure plug employing a resilient central potion that is forced radially outward with a squeeze actuation to provide a seal of an aperture.
Figure 9A:
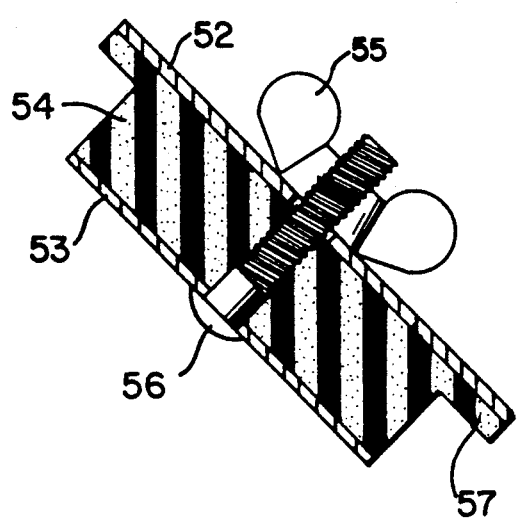

In the embodiments shown in FIGS. 9A and 9B the aperture 24 is closed with a plug assembly, generally identified as 50. This closure device has outer and inner rigid compression plates 52 and 53, with the inner plate 53 being small enough to readily pass through the aperture 24. As depicted, the outer compression plate 52 is made sufficiently large so that there is no possibility of its passing through aperture 24 into the interior of the container. Carried between the inner and outer plates is a rubber or rubber-like resilient, flanged disc 54 which is caused to be compressed by thumb or wing nut 55 which is mounted on a threaded shank of carriage bolt 56. The rotating of the wing nut 55 inwardly causes the resilient disc portion 54 to compress axially and be expanded radially and outwardly to seal the aperture 24. An outward movement of the wing nut allows the resilient portion to return to its original form, as in FIG. 9A. FIG. 9A is a diagrammatic representation of the removed plug, with the disc-like portion 54 having an outwardly-extending lip portion 57 which provides an outer gasket seal of the plug to the container wall.

FIG. 9B shows the plug in a sealing condition, with an optionally employed flexible liner, bladder or bag shown in phantom representation at 58. Such a liner, bladder or bag may be inserted through the aperture 24 and then the expanding plug closure inserted and manipulated to the condition of FIG. 9B. When a flexible bag is included, it may be used for retaining fluids such as milk and the like. When a bag is to be used with this container, the lip portion 57 of the plug insures that a seal and retaining at the aperture are achieved. It is to be noted that instead of using the wing nut 55, a special nut can be provided and used to prevent tampering. Such a nut is shown at 78 in FIG. 12A, and at 126 in the embodiment illustrated in FIG. 13, and will be described later in connection with those embodiments.

As noted above, the illustrated closure can be used with or without a bladder or liner bag. Where a flexible liner, bladder or bag is used, the outer portion thereof may be drawn around the nut and secured at 59, such as by a heat seal, to provide a tamper-evident closure and sterile conditions for the plug (See FIG. 9B). The expanding resilient plug closure may be used to seal the container which can then be pressurized.

Figure 10:
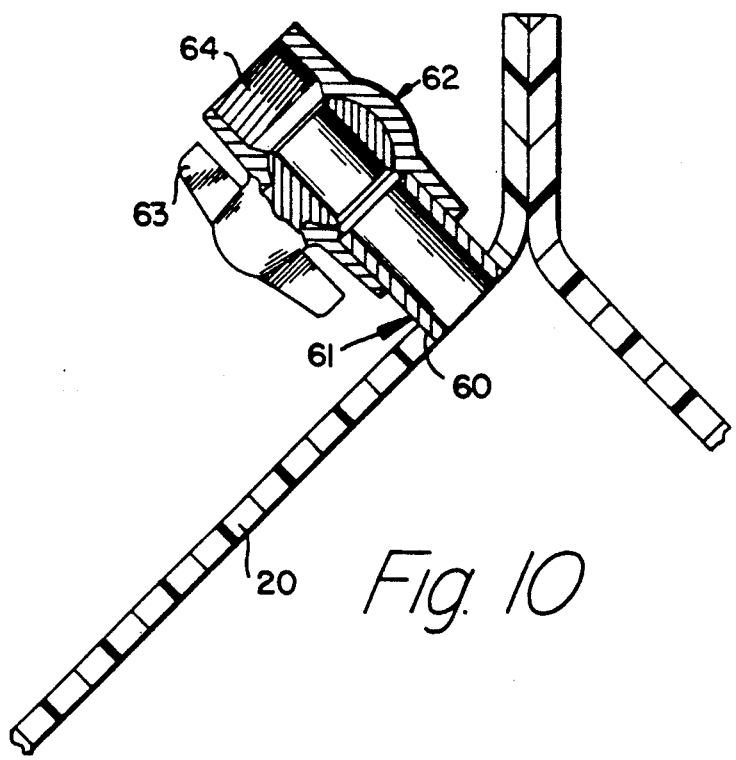
FIG. 10 is a sectional and partly fragmentary side view of a valve adapted to be selectively turned to open or close the interior of the container for draining or filing the interior of the container.

The embodiment of FIG. 10 anticipates that drainage or filling through a pipe or tube of the container may be desired, and that fluid may be desired to be sorted within the container. An aperture of reduced diameter and identified as 60 is shown and, rather than the larger aperture 24 of prior embodiments, this aperture 60 is formed in the container side wall and a nipple 61 is fitted therein. This nipple is usually of plastic, but may be of metal. This nipple is cemented, bonded, threaded or welded in place to provide a fluid-tight seal. Mounted and secured to this nipple 61 is a valve 62 which is turned on and off by a wing knob or handle 63 which is manipulable by the user. As depicted, the valve is open for flow to and through the central portion. This valve is also shown with threads 64 in the exterior passageway. This nipple and passageway provide for filling and draining of the container by gravity or under pressure.

Figure 11:
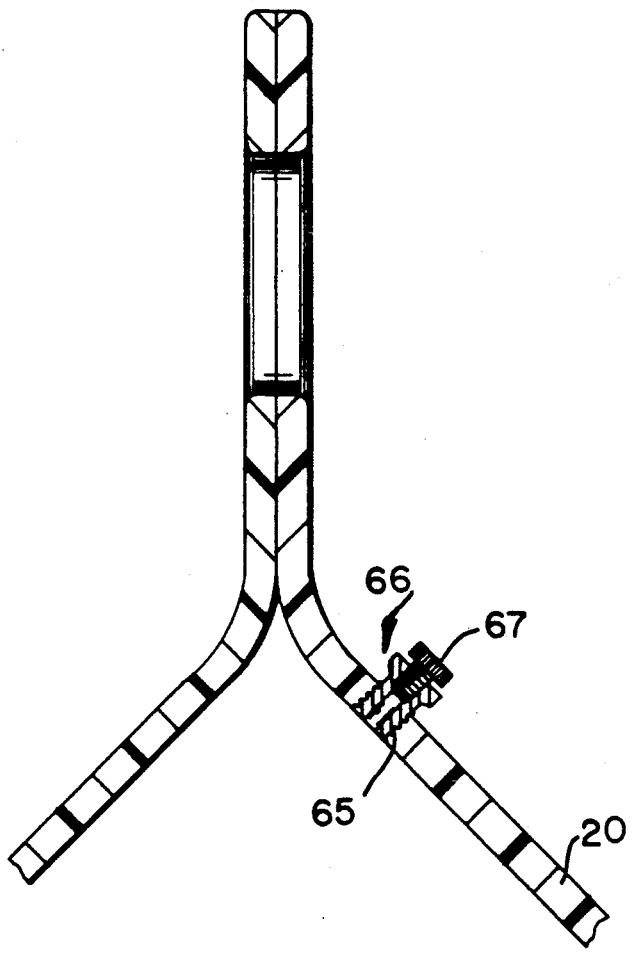
FIG. 11 is a diagrammatic and sectional side view of a threaded insert providing means to vent the interior of the container and prevent a vacuum.

In the embodiment shown in FIG. 11 a typical small vent is provided in the container side wall. The aperture which is depicted can be threaded, and as shown is of a small diameter. The threaded aperture is identified as 65 and a threaded insert 66 is mounted therein. This insert is secured so as to provide a fluid-tight mounting. The outer portion of insert 66 is provided with female threads in which is removably mounted a threaded vent plug 67. This plug when opened allows the interior of the container to be vented. When tightened, the screw 67 closes the vent. It is also noted that many other types of vents are available, some of which are automatic vacuum breakers. Some venting is required with some types of fittings during dispensing from or filling of the container. Such venting prevents vacuum or pressure from developing within the container.

Figure 12A:
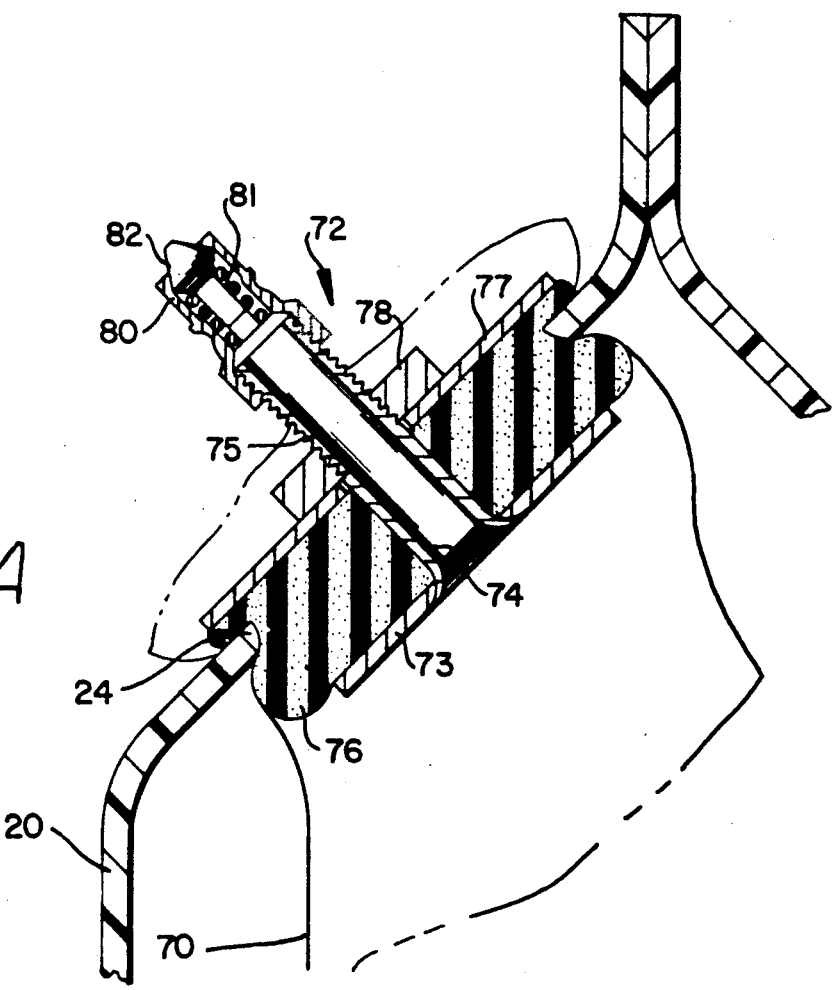
FIG. 12A is a sectional and diagrammatic side view of a closure plug with a hollow stem and with a coupling having a check valve, this closure used with a container provided with or without a bladder portion, and with this container usually for dispensing liquid contents from the container.
Figure 12B:
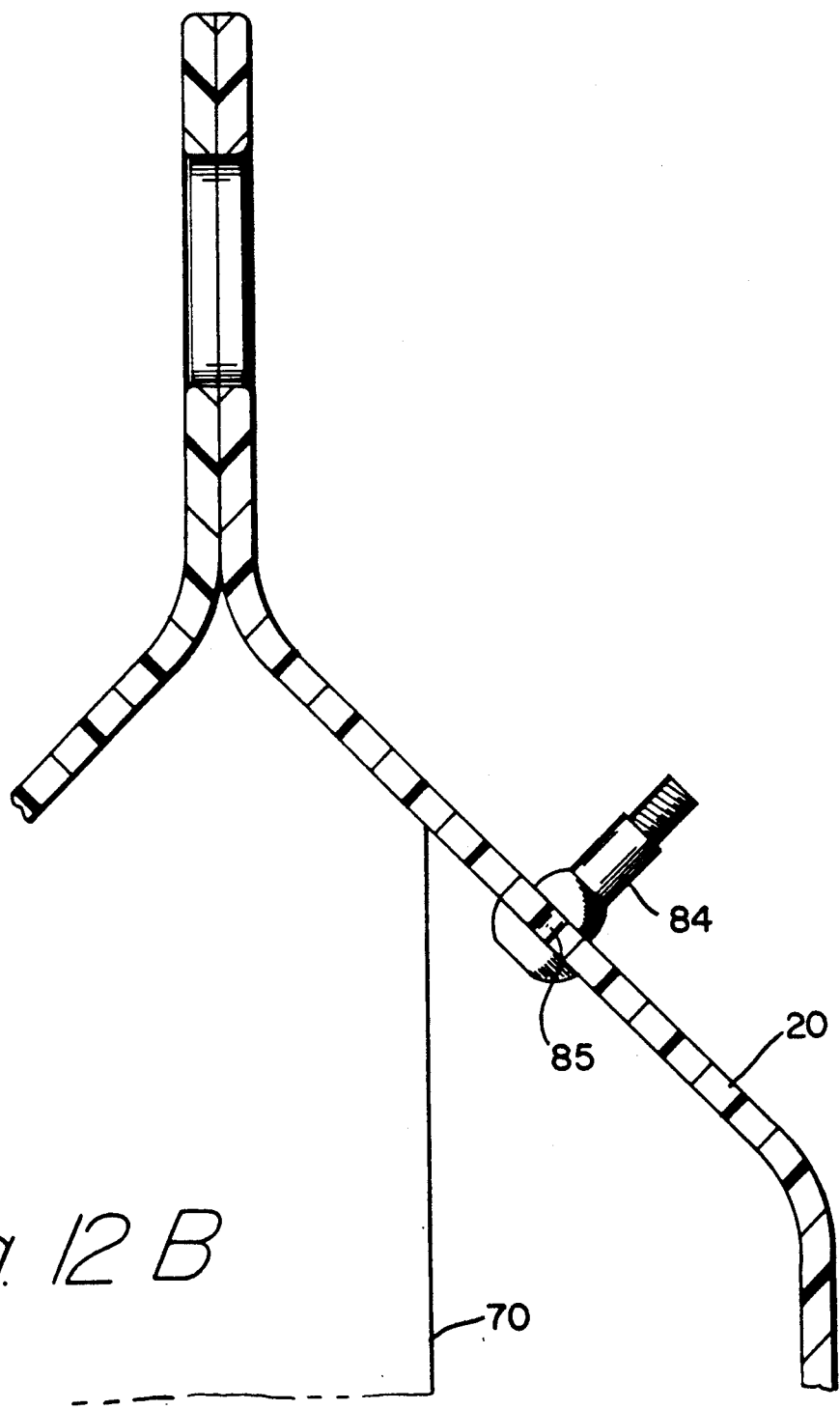
FIG. 12B is a diagrammatic side view of a tubeless tire-type valve stem mounted in an aperture in the container, this valve stem usually for pressurizing the container.

In the embodiments shown in FIGS. 12A and 12B it is to be noted that the container 20 may also be formed so as to retain a bladder therein. As sen in FIG. 12A, it is contemplated that a resilient bag, liner or bladder 70 is inserted within the container 20 through the aperture 24 formed in the end wall thereof, in the same manner as described earlier in connection with the embodiment shown in FIG. 9B. After insertion, one of the bladder, liner or bag is retained by the closure member 72 in the aperture 24 formed in the container end.

In FIG. 12A, the bladder 70 is shown as secured to and in the aperture 24 by the closure member 72. This closure member includes an inner plate member 73 having a stem portion 74 integral with or secured thereto and which stem is hollow and has an externally-threaded portion 75. A resilient, flanged disc-like member 76 is shown. As is illustrated in FIG. 12A, this resilient member 76 is bulged and radially expanded to mate with and seal aperture 24 in the container. This bulged, resilient portion is depicted between inner member 73 and an outer compression plate 77. This compression plate is moved inwardly by a compression nut 78, which is moved inwardly along threads 75 to capture and retain the bladder or liner (when used) and close the aperture. Removably mounted on the threaded end of the stem portion 74 is a threaded male hydraulic quick coupling 80 in which a spring 81 moves a sealing plunger 82 outwardly. This plunger is moved counter-flow to the force of the spring 81 by a female quick coupling member, not shown, to open this passage and provide for fluid filling and/or discharge from within the container and/or bladder or bag.

In FIG. 12B there is depicted a side view of a tubeless tire-type valve stem which is inserted into a formed hole in the container. This stem member is identified as 84 and the hole in the container is identified as 85. After mounting the valve stem in the container wall, a spring-type check valve (valve core) is inserted. This check valve is easily replaced if and when damaged. Air or gas under pressure is flowed into the container through this stem when the container is to be pressurized with or without a bladder 70 or flexible bag or liner.

The nut 78 may be made so as to be turned only with a special wrench or spanner to provide a measure of tampering protection. With a liner, bag or bladder, the neck thereof may be provided with sufficient length to extend beyond the fitting and by and with a seal or the like, the extending neck portion may be closed and secured to prevent tampering, in the same manner as described earlier in connection with FIG. 9B.

Figure 13A:
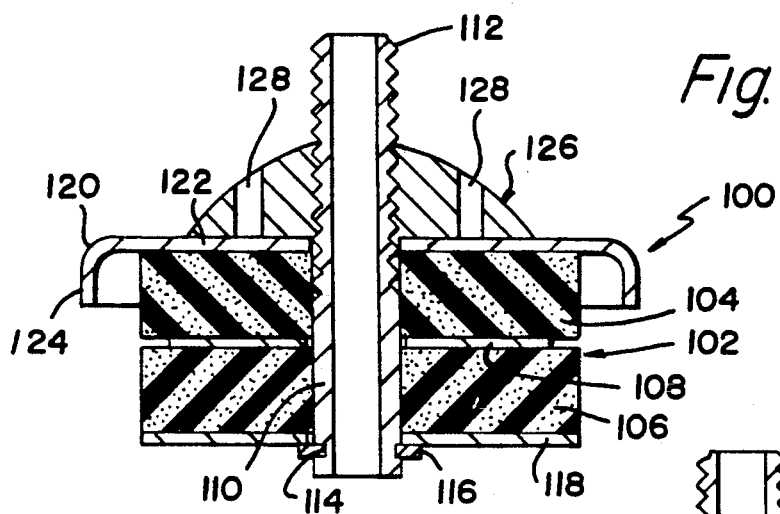
FIG. 13A is a fragmentary sectional view showing a unique plug of this invention in an unexpanded condition.

Referring to FIG. 13A an expanded plug assembly 100 of this invention is shown. This plug assembly can be used in place of the plug assembly 50 (FIGS. 9A and 9B) and closure member 72 (FIG. 12A) in the various environments disclosed i connection with the embodiments illustrated in FIGS. 9 and 12. Specifically, the expanding plug assembly 100 can be employed to seal an aperture 24 in container 200, either alone or with a liner, bag or bladder 58 (or 70) disposed within the aperture. Also, when a liner, bag or bladder is employed, it can be sealed over the plug assembly 100 to provide a tamper-evident closure in the same manner as discussed above in connection with FIG. 9B.

As can be seen in FIG. 13A the expanding plug assembly 100 includes a expandable plug body 102 which includes separate resilient members 104 and 106. These resilient members are in the form of short cylinders or disks formed of a rubber-like or elastomeric material which will radially expand when compressed axially. Most preferably each of the members 104 and 106 are made of the same material and of the same dimension. The plug body 102 further includes a dividing or separating disk or diaphragm 108 which preferably is made of a thin metal or plastic material that is substantially non-compressible. This diaphragm is positioned between the resilient members 104 and 106, and preferably has a slightly smaller diameter (on the order of 25% smaller) than the outside diameter of the resilient members 104 and 106, when said resilient members are in the uncompressed (and unexpanded) condition shown in FIG. 13A. The function of the dividing disk or diaphragm 108 will be discussed in greater detail later in this application.

Still referring to FIG. 13A, a hollow stem 110 passes through aligned passageways in the resilient members 104, 106 and the dividing diaphragm 108 to assist in maintaining these elements of the plug body 102 in proper alignment with each other. In the illustrated embodiment the stem includes an upper threaded end 112 and an annular groove 114 at the lower end thereof. The annular groove 114 receives a retaining ring 116 which functions to transmit compressive forces to a lower compression plate 118, as will be discussed in greater detail hereinafter. However, it should be noted that the lower end of the stem 110 can be flared in a manner similar to that shown at 73 in FIG. 12A, to thereby eliminate the need for utilizing a retaining ring 116 and lower compression plate 118 in the plug assembly. In this latter embodiment the flared end of the stem would function as the lower compression plate to transmit compressive forces to the plug body 102. It also should be noted that the hollow stem 110 can be employed in connection with a threaded male hydraulic quick coupling 80 in the same manner as discussed earlier in connection with FIG. 12A. For purposes of brevity this discussion will not be repeated herein.

Figure 13B:
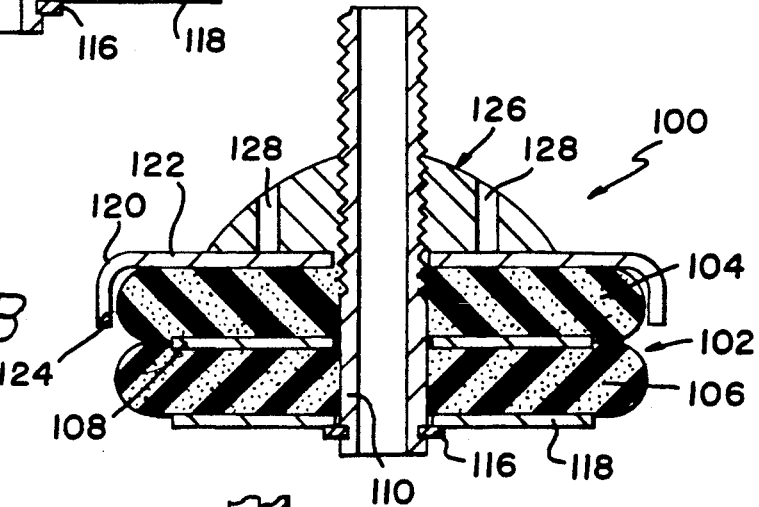
FIG. 13B is a sectional view through the plug shown in FIG. 13A, but showing its configuration after the resilient body thereof has been expanded.
Figure 13C:
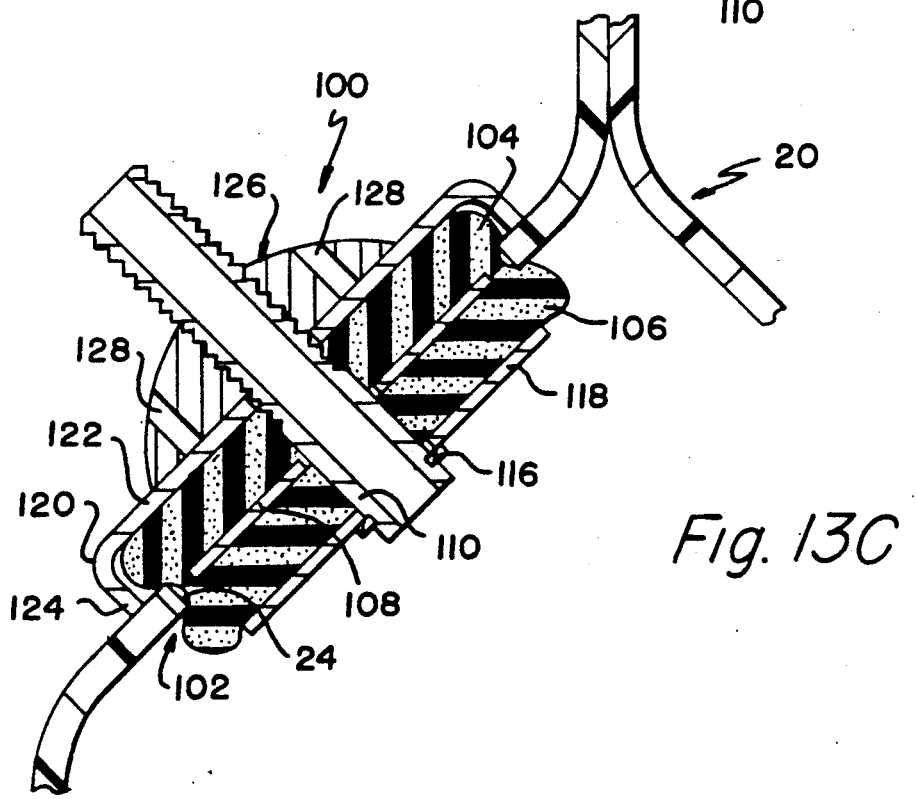
FIG. 13C is a fragmentary sectional view showing the cooperation between the unique plug of this invention and a container aperture, when the plug has been radially expanded into sealing engagement with the walls of the aperture.

As is clearly illustrated in FIGS. 13A-13C, the plug body 102 is retained between the lower compression plate 118 and an upper compression plate 120. In the illustrated embodiment the upper compression plate has an inverted cup-shape formation, including a generally circular base section 122 for engaging the upper planar surface of resilient member 104, and an annular, downturned leg 124 spaced radially outwardly o the uncompressed resilient members 104 and 106 (FIG. 13A), for engaging an outer surface of the container to aid in positioning the plug assembly 100 in the aperture 24, with the mid-point of the plug body 102 being roughly aligned with the wall of the aperture 24. This feature will be discussed in detail later herein.

In the illustrated embodiment a special nut or fitting 126 is provided. This fitting includes a generally smooth, hemispherical outer surface to preclude its movement with a conventional wrench, pliers or similar tool. Instead, the fitting 126 includes a plurality of circumferentially spaced-apart, axially extending passages 128, which also are radially spaced from the central threaded passageway through which stem 110 passes, to receive prongs, pins or fingers of a special tool (not shown employed to rotate the nut.

When the nut 126 is rotated to move it down the threaded stem 110, the resilient members 104 and 106 will be compressed between the upper and lower compression plates 118 and 120. This axial compression causes a radial expansion of each of the resilient members 104 and 106, with the radial expansion being generally greatest at the center of each of the members 104 and 106. In this regard it should be noted that the disk or diaphragm 108 frictionally engages confronting surfaces of the resilient members 104 and 106 to slightly impede radial expansion in the region of the diaphragm. The net effect of this arrangement is to cause the regions of greatest radial expansion to be in the upper and lower quadrants of the plug body 102, as is shown best in FIG. 13B.

The plug assembly 100 is employed by first inserting it into the aperture 24 of the container 20, in the uncompressed condition shown in FIG. 13A. In this regard it should be noted, that the outside diameter of the lower compression plate 118 is smaller than the diameter of the aperture 24, to thereby permit the plug to be inserted within the aperture. When the plug assembly 100 is inserted into the aperture the lower annular surface of the downturned leg 124 of the upper compression plate 120 will engage the outer surface of the container 20, to thereby approximately center the plug 100 within the aperture 24. With the plug assembly 100 approximately centered within the aperture 24 the compression nut 126 is rotated to axially squeeze the plug body 102, thereby causing the resilient members 104 and 106 thereof to radially expand into the general configuration shown in FIG. 13B. Since the upper and lower quadrants of the plug body 102 expand the greatest initially, they tend to surround the periphery of the aperture 24 to positively center the plug assembly 100 within said aperture, as is shown best in FIG. 13C. The central region of the plug body 102, that is, the region aligned with the diaphragm 108, tends to expand more gradually due to the frictional interaction between the diaphragm 108 and the confronting surfaces of the resilient members 104 and 106. However, radial expansion does take place in this central region to seal the plug body against the peripheral surface defining the aperture 24.

Since the resilient members 104 and 106 preferably are of the same material and same dimensions they will tend to bulge to the same extent. This provides a substantially equal elastic force on opposite sides of the aperture 24, to positively retain the plug assembly 100 in sealing engagement within the aperture.

A number of modifications can be made to the plug assembly 100 within the scope of this invention. For example, the hollow stem 110 can be replaced with a solid stem, such as is illustrated in FIGS. 9A and 9B. In addition a wing nut (e.g., 55 in FIGS. 9A and 9B) or compression nut (e.g., 78 in FIG. 12A) can be employed in place of the special compression nut or fitting 126. Moreover, a conventional flat upper compression plate (e.g., 52 in FIG. 9A) can be employed in place of the inverted cup-shaped compression plate 120. However, the compression plate 120 is preferred since it provides a rough, or approximate centering of the plug prior to expansion.

Figure 14:
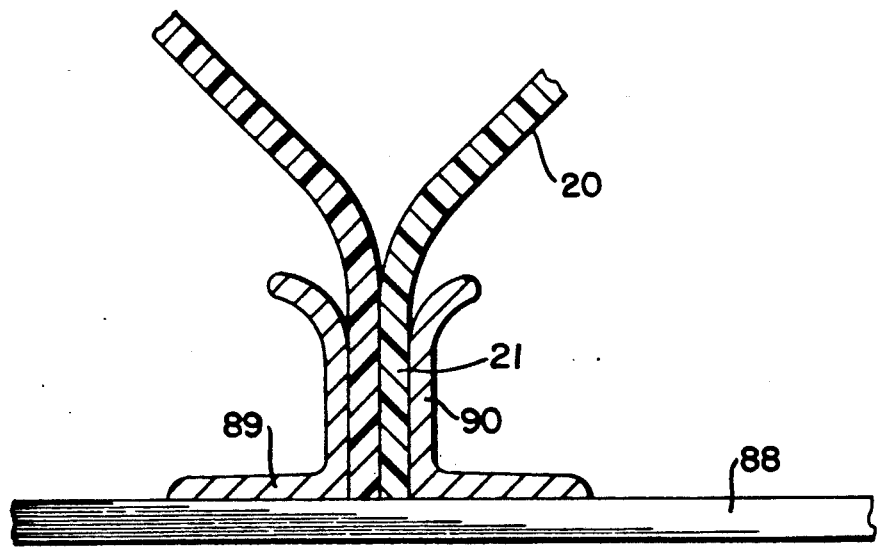
FIG. 14 is a diagrammatic side view of a bottom or support base providing a stand for the container.

Referring to FIG. 14, a support stand for the container 20 is shown. This support stand provides a grip for the flattened and contiguous ends 21 and 22 (FIG. 2) of said formed container. As depicted, a plate member 88 has secured thereto like right and left angle members 89 and 90. These angle members are spaced from each other to provide a predetermined slot into which the flattened end of the container usually the bottom end) may be removably inserted. This support stand is anticipated to maintain the container in a substantially upright condition during storage, shipping and/or other use. Alternate constructions of such a support stand contemplate making the stand as a casting. This stand may be an extrusion which can be cut transversely to length or may be a block member with a formed slot. Whatever the construction, it is contemplated that the flattened ends of the container 20 be sized to be removably mounted within support slot means to provide more or less an upright retention and support of the container.

Figure 15:
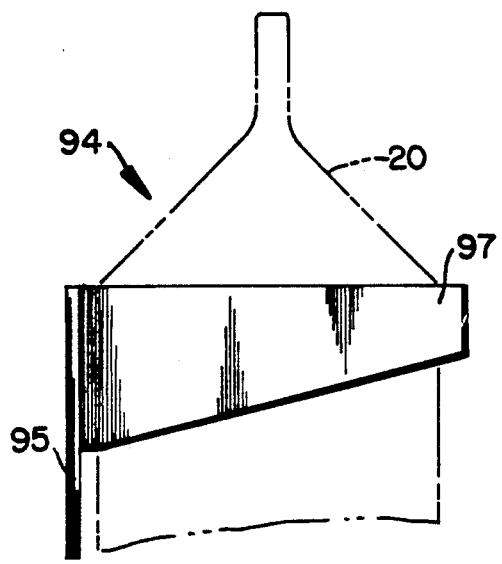
FIGS. 15A and 15B are diagrammatic and fragmentary side and front views, respectively, of a wall support or bracket for the tubular container of this invention.
Figure 15:
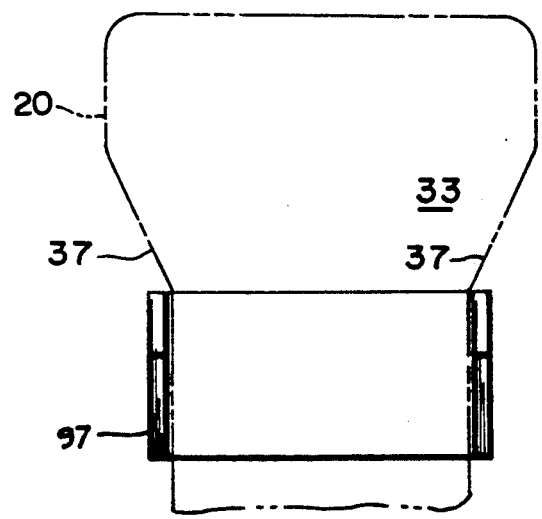

Referring next, and finally to FIGS. 15A and 15B, there is depicted a container in a scale substantially that of FIGS. 1, 2 and 3. The flattened ends of said container produce the widened transition portion 33 that provides an engaging means 37 for a U-shaped bracket for supporting the container on a wall or the like. As seen in FIGS. 15A and 15B, a support bracket, generally identified as 97, may be secured to a wall and the like by screws, bolts or the like, which are not shown. A U-shaped metal or plastic member 97 is formed with an open outer portion disposed to slideably engage and retain the tubular body of the container 20. This U-shaped member 97 is preferably made from a flat strip of metal or plastic which may be tapered as shown. This member 97 is attached to plate 95 by welding, adhesive, bolts or the like. The method of attaching is a matter of selection. The U-shaped member 97 is sized to accommodate the container or containers to be supported.

It is also contemplated that this support bracket may be formed from one piece either of metal, such as aluminum, or of plastic. As the U-shape is open, this portion may be provided with a little spring much as found by and in a pants clip for bicycle riding. Whatever the construction, this support bracket is disposed to removably retain the container at the desired position (usually vertical) and condition. The container can be and often is removed from the support bracket before the contents are removed or when fluid is to be discharged. This support bracket may be and is often used during filling, storage and/or dispensing of content when the contents are of fluid.

This container is shown with may closure members and is shown in selected embodiments with a liner or an internal bladder or resilient bag that can be pressurized to dispense liquids and/or flowable powders. The supporting of the container in a storage and use position is shown with associated components. This container has may advantages, including selective diameters and lengths. The wall thickness of the container is selected to accommodate the intended use. As noted above, the desired tubular container can be produced in small quantities and in several lengths and tubular sizes. This production requires a minimum tooling cost resulting in low production expenditures.

In FIG. 1, the container 20 is shown with aperture 24 toward the top, but it is realized that the container can be turned end-for-end and that this showing of the aperture is merely a matter for illustration. The container may also be formed with handle portions or apertures 23 in both ends whereat, rather than a shorter end portion 21, the end extent 21 is like 22 shown. The handle portion and the outer edges are smoothed to remove any sharp and potential cutting edges. This does not preclude the making of a container with no handle portions, with both ends formed like end 21 seen in FIGS. 1 and 2. As noted above, the container 20 is made from thermoplastic tubing such as PVC. This does not preclude making the container from sheet material which is heated and rolled into a tube usually over a mandrel. The longitudinal seam is welded, bonded or cemented to provide an open-ended tube which is then formed as noted above. Also not precluded is injection molding, but the cost of dies for such finished results is usually not practical.

This container is simple to make since adjustment may be made readily in length, diameter and wall thickness. The cutting of such plastic tubing to a desired length is achieved easily. This container may be converted easily from a container for solid materials such as rod-like components, which include cutting bars, welding rods and the like, to a container for liquids and/or powder, including granular substances. This container provides liquid-tight fittings as shown in the above-presented and described Figures. A valve (FIG. 10) for draining the fluid contents is also illustrated. It is to be noted that in forming the ends into flattened, substantially centrally-positioned ends, the flattened end portions protrude sufficiently to prevent the container from rolling, particularly when round tubing is used to make the container. These containers can be stacked on their sides and these tapered or sloped portions protect the plugs and fittings from wear and damage from rough handling during shipping and storage. These sloped end portions in which the aperture or vent are formed provide a flat surface for a smooth and positive attachment of a fitting as exemplified above.

Whether the tubular extruded tubing is made of a thin or thicker wall, the skill needed for producing such containers can be achieved readily after a short training period. This is a sharp contrast to that for molding, deep drawing and like skills needed in the production of prior art containers. The container of this invention has a final shape in which the flattened and sealed ends prevent rolling and, as tubular forms, are stacked easily on their sides for storage in a minimum amount of space. The built-in handles (when formed) provide means for carrying the container by hand, hoisting, lashing or suspending.

This container is made of a tough, wear-resistant plastic on which a label may be attached to the outside by cement or the like. The container may be preprinted to indicate the product, instructions or use, danger or warning signs, warranties and the like. The interior contents are not affected by such exterior labels. When this container is to store and dispense fluids such as milk, wherein the integrity of the fluid must be maintained, a removable bladder, bag or liner may be employed as noted in the above figures and description. The bladder can be installed through the aperture 24 in the container 20 and pressurizing can then be used as an assist in the dispensing. This removable liner, bag or bladder can provide the inert, sanitary preconditions required for foodstuffs, chemicals or certain granular products. The bladder may or may not be pressurized and gravity may be used to dispense the contents. The bladder may be removed for replacement or disposal, or may be sterilized for reuse and reinsertion.

It is to be noted that a bladder, bag or liner may be inserted permanently into the container. When this is desired, the bladder is usually inserted before forming the end seals. The installation process of a bladder is in accordance with the contents to be stored and the severity of use for the bladder. It is to be noted that the container may be pressurized with compressed air or inert gas between the bladder and container shell. This pressurization is achieved easily by using a fitting in the container wall such as shown in FIG. 12B. The pressurizing of the container without a bladder also permits fluids to be dispensed without syphon tubes and the like. It is also to be noted that the selection of thermoplastic materials allows color selections so that the contents may be identified readily. This is particularly useful where chemicals are involved or mixtures are to be considered.

The container of this invention, although of a comparatively thin wall, allows outside storage with a capability of withstanding most severe environmental conditions. This tubing from which the container is formed can also be stored safely outdoors for long period of time in the finished or unfinished form.

The above-described container anticipates the squeezing of the end portions together which usually produces a fluid-tight closure, which is usually preferred, but this is not to preclude making of the container less than fluid-tight as permanent or removable bladders, bags or liner members may be used for providing a fluid-tight enclosure. The noting that this container is preferably fluid-tight is that the storage of the components is usually beneficial if moisture is excluded or maintained.

The container of this invention provides a method of forming said container. The container may be made essentially tamperproof with the use of a seal of the nozzle, bag or bladder. This method of making said container includes the steps of:

providing a body portion having a selected length and of a generally tubular shape and cut from a rigid thermoplastic material having a more-or-less regular wall thickness;

heat-softening both end portions of the container and, while softened, suing die means for squeezing the walls together to form a contiguous, substantially centrally-positioned, side-by-side condition closed-end portion, with the transition portion from the tubular body portion to the flattened end portion providing two substantially flat and tapered and sloped extents at each end, these tapered portions diverging from the flattened end portion to the original tubular configuration, and with these flattened end portions providing extending means that protrude beyond the outer configuration of the tubular body and provide means for preventing unwanted rolling and for desired suspension and the like, and forming and providing an access aperture in and through a substantially flat and tapered portion of the container end, and closing said aperture by a removable member.

Terms such as "left," "right," "up," "down," "bottom," "top," "front," "back," "in," "out" and the like are applicable to the embodiments shown and described in conjunction with the drawings. These terms are merely for the purposes of description and do not necessarily apply to the position in which the container and closure devices may be constructed or used.

While particular embodiments of the container have been shown and described, it is to be understood that the invention is not limited thereto and protection is sought to the broadest extent the prior art allows.

Without further elaboration, the foregoing will so fully illustrate my invention that others may, by applying current or future knowledge, adopt the same for use under various conditions of service.

What is claimed as the invention is:

1. A plug assembly for sealing an aperture in a rigid member, said plug assembly including inner and outer rigid compression plates and a plug body between said plates, characterized in that said plug body includes a pair of resilient members and a separating member located between said resilient members, said resilient members being capable of expanding radially in a direction substantially perpendicular to the space between the inner and outer rigid compression plates when said inner and outer rigid compression plates are moved toward each other, said separating member including opposed substantially planar surface means frictionally engaging confronting substantially planar surfaces of the pair of resilient members for impeding radial expansion of the resilient members in the region of the separating member when said outer and inner compression plates are moved toward each other, and means for moving said inner and outer compression plates toward each other for causing maximum radial expansion of said resilient members in regions spaced from the confronting surfaces.

2. The plug assembly of claim 1 characterized in that said separating member is substantially non-compressable.

3. The plug assembly of claim 2 characterized in that said separating member is thinner than the resilient members.

4. The plug assembly of claim 1 characterized in that said resilient members and separating member are substantially circular in plan view and wherein the diameter of the resilient members is greater than the diameter of the separating member.

5. The plug assembly of claim 4 characterized in that the diameter of the separating member is approximately 25% smaller than the diameter of the resilient members, as measured in plan view.

6. The plug assembly of claim 1 characterized in that each of said resilient members is of the same material and dimensions.

7. The plug assembly of claim 1 wherein said pair of resilient members includes an outer resilient member adjacent the outer rigid compression plate, said outer rigid compression plate including a peripheral surface overlying side surfaces of said outer resilient member for engaging an outer surface of a container when said plug assembly is inserted into an aperture in said container, for aiding in positioning the plug assembly within said aperture.

8. The combination of a plug assembly and container, said container having a wall with an aperture extending therethrough, said wall having outer and inner surface regions adjacent said aperture, said plug assembly for sealing said aperture including inner and outer rigid compression plates and a plug body between said plates, said plug body including an outer resilient member adjacent the outer rigid compression plate and an inner resilient member adjacent the inner rigid compression plate and a separating member located between said outer and inner resilient members, said resilient members being movable radially in a direction substantially perpendicular to the spacing between the inner and outer rigid compression plates when the inner and outer rigid compression plates re moved toward each other, said separating member including opposed surface means frictionally engaging confronting surfaces of the outer and inner pair of resilient members for impeding radially expansion of the outer and inner resilient members in the region of the separating member when said outer and inner compression plates are moved toward each other, and means for moving said inner and outer compression plates toward each other for causing maximum radial expansion of the outer and inner resilient members in regions spaced from the confronting surfaces, said outer rigid compression plate having a peripheral surface overlying side surfaces of the outer resilient member, said plug assembly being located within the aperture with the peripheral surface of the outer rigid compression plate in engagement with the outer surface region of the container wall and with said outer and inner resilient members partially overlying the outer and inner surface regions, respectively, after said plug assembly has been actuated to seal said aperture.

* * * * *